(12) United States Patent
von Dohlen (10) Patent No.: US 10,188,905 B2
(45) Date of Patent: Jan. 29, 2019

(54) SYSTEM FOR PROCESSING EXERTION DATA DERIVED FROM EXERTION DETECTION DEVICES

(71) Applicant: Tri2Focus Inc., Cypress, TX (US)

(72) Inventor: Eric Michael von Dohlen, Cypress, TX (US)

(73) Assignee: Tri2Focus, Inc., Cypress, TX (US)

( * ) Notice: Subject to any disclaimer, the term of this patent is extended or adjusted under 35 U.S.C. 154(b) by 230 days.

(21) Appl. No.: 15/093,473

(22) Filed: Apr. 7, 2016

(65) Prior Publication Data

US 2016/0300103 A1    Oct. 13, 2016

Related U.S. Application Data

(60) Provisional application No. 62/144,161, filed on Apr. 7, 2015.

(51) Int. Cl.
| | |
|---|---|
| *A63B 24/00* | (2006.01) |
| *G09B 19/00* | (2006.01) |
| *G06K 9/00* | (2006.01) |
| *G06F 17/30* | (2006.01) |
| *H04L 29/08* | (2006.01) |

(52) U.S. Cl.
CPC .......... *A63B 24/0075* (2013.01); *A63B 24/00* (2013.01); *G06F 17/30569* (2013.01); *G06F 17/30867* (2013.01); *G06K 9/00342* (2013.01); *G09B 19/00* (2013.01); *A63B 2024/0068* (2013.01); *H04L 67/06* (2013.01)

(58) Field of Classification Search
CPC . A63B 24/00; A63B 24/0062; A63B 24/0075; A63B 2024/0068; G06K 9/00342; G09B 19/00; G09B 19/0038
See application file for complete search history.

(56) References Cited

U.S. PATENT DOCUMENTS

| | | | | |
|---|---|---|---|---|
| 6,050,924 A | * | 4/2000 | Shea ................... | A63B 24/0062 482/57 |
| 6,450,922 B1 | * | 9/2002 | Henderson ......... | A63B 24/0006 482/8 |
| 7,771,320 B2 | * | 8/2010 | Riley ................. | A63B 24/0006 434/238 |
| 2001/0056241 A1 | * | 12/2001 | Nissila ................... | A61B 5/222 600/483 |
| 2006/0205564 A1 | * | 9/2006 | Peterson ................ | A63B 69/00 482/8 |

(Continued)

*Primary Examiner* — Milap Shah
(74) *Attorney, Agent, or Firm* — DeLizio Law, PLLC (57) ABSTRACT

Some embodiments implement a method for an electronic feedback loop based on data generated by at least one bike power sensor. The method can include generating, by an exertion sensor data processor based on the one or more electronic files, data indicating training phases for a race season, wherein each of the training phases define swim workouts, bike workouts, and run workouts. The method can also include receiving, by the exertion sensor data processor via the electronic network, an electronic exertion data file indicating power output detected by the bike power sensor. The method can also include modifying, by the exertion sensor data processor, at least one of the swim workouts, bike workouts, or run workouts based on the power output detected by the bike power sensor.

10 Claims, 8 Drawing Sheets

(56) References Cited

U.S. PATENT DOCUMENTS

| | | | |
|---|---|---|---|
| 2007/0219059 A1* | 9/2007 | Schwartz | A61B 5/0205 |
| | | | 482/8 |
| 2013/0040272 A1* | 2/2013 | Booher | G06F 19/3481 |
| | | | 434/254 |
| 2013/0288223 A1* | 10/2013 | Watterson | G09B 19/00 |
| | | | 434/428 |
| 2014/0249661 A1* | 9/2014 | Dibenedetto | A63B 24/0062 |
| | | | 700/91 |
| 2016/0263439 A1* | 9/2016 | Ackland | G06F 19/3481 |

* cited by examiner

| SEASON SCHEDULE DATABASE | | | | | | | |
|---|---|---|---|---|---|---|---|
| 1. START WEEK | M | T | W | TH | FR | SAT | SUN |
| 2. BUILD(1) WEEK | M | T | W | TH | FR | SAT | SUN |
| 3. BUILD(1) WEEK | M | T | W | TH | FR | SAT | SUN |
| 4. REST WEEK | M | T | W | TH | FR | SAT | SUN |
| 5. BUILD(1) WEEK | M | T | W | TH | FR | SAT | SUN |
| 6. BUILD(2) WEEK | M | T | W | TH | FR | SAT | SUN |
| 7. REST WEEK | M | T | W | TH | FR | SAT | SUN |
| 8. MAX WEEK | M | T | W | TH | FR | SAT | SUN |
| 9. TAPER WEEK | M | T | W | TH | FR | SAT | SUN |
| 10. RACE WEEK | M | T | W | TH | FR | SAT | SUN |
| 11. RACE DAY | | | | | | | |

SEASON SCHEDULE DATABASE

| | M | T | W | TH | FR | SAT | SUN |
|---|---|---|---|---|---|---|---|
| 1. START WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 2. BUILD(1) WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 3. BUILD(1) WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 4. REST WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 5. BUILD(1) WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 6. BUILD(2) WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 7. REST WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 8. MAX WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 9. TAPER WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 10. RACE WEEK | SWIM (XX) BIKE (YY) | RUN (LONG) | SWIM (XX) BIKE (YY) | SWIM (XX) | BIKE (LONG) | OFF | SWIM (LONG) RUN (ZZ) |
| 11. RACE DAY | | | | | | | |

| WORKOUT SCHEDULE | | | LOGGED STRESS |
|---|---|---|---|
| DAY | SPORT | PRESCRIBED STRESS | |
| MON | SWIM | 10 | 0 |
|  | BIKE | 15 | 12 |
| TUE | RUN | 40 | 46 |
| WED | SWIM | 10 | 10 |
|  | BIKE | 20 | 20 |
| THUR | SWIM | 10 | 7 |
| FRI | BIKE | 35 | 0 |
| SAT |  |  |  |
| SUN | SWIM | 10 | 12 |
|  | RUN | 20 | 23 |
| TOTAL PRESCRIBED STRESS 170 | | | 130 |

SYSTEM FOR PROCESSING EXERTION DATA DERIVED FROM EXERTION DETECTION DEVICES

RELATED APPLICATIONS

This application claims the priority benefit of U.S. Provisional Application No. 62/144,161, filed Apr. 7, 2015.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Eric von Dohlen.

FIELD

Embodiments of the inventive subject matter relate to electronic systems for processing exertion data derived from exertion detection devices.

BRIEF DESCRIPTION OF THE FIGURES

Embodiments of the invention are illustrated in the Figures of the accompanying drawings in which.

DESCRIPTION OF THE EMBODIMENTS

This section describes operations associated with some embodiments of the invention. In the discussion below, the flow diagrams will be described with reference to the diagrams presented above. However, in some embodiments, the operations can be performed by logic not described in the diagrams.

In certain embodiments, the operations can be performed by executing (on one or more processors) instructions residing on machine-readable media (e.g., software), while in other embodiments, the operations can be performed by hardware and/or other logic (e.g., firmware). That is, the components described herein my include hardware, software, or other logic for performing the functionality described herein. In some embodiments, the operations can be performed in series, while in other embodiments, one or more of the operations can be performed in parallel. Moreover, some embodiments can perform less than all the operations shown in any flow diagram.

Introduction

Embodiments of the inventive subject matter include components that determine, based on data derived from exertion sensors (e.g., bicycle power meter, lactate sensor, heart rate monitor, run pace sensor, run power sensor, etc.), an athlete's swim/bike/run exertion for a given swim/bike/run workout, produce data files indicating the athlete's exertion, and transmit those data files over an electronic network for further processing. Some embodiments include an exertion sensor data processor that receives the data files indicating the athlete's exertion (as determined by the exertion sensors) for one or more swim/bike/run workouts (aka training sessions). The exertion sensor data processor can periodically process exertion-sensor derived exertion data contained in the data files to implement an adaptive electronic feedback loop that modifies parameters used in determining a workout schedule for the athlete. As part of the feedback loop, the exertion sensor data processor can use the exertion-sensor-derived exertion data, which indicates the athlete's exertion for one or more workouts, to compute an actual stress level for the one or more workouts. The exertion sensor data processor can use the actual stress level to determine whether to modify the athlete's future workout schedule, such as to account for a stress shortfall (i.e., the athlete's actual stress level is less than a prescribed stress level indicated the athlete's workout schedule). In some embodiments, the exertion sensor data processor may execute the adaptive electronic feedback loop on-demand. For example, the exertion sensor data processor may execute the adaptive electronic feedback loop in response to receiving exertion-sensor-derived exertion data indicating the athlete's exertion. Alternatively, the exertion sensor data processor may execute the adaptive feedback loop periodically, or at specified times.

Architecture of Some Embodiments

Figure 1:
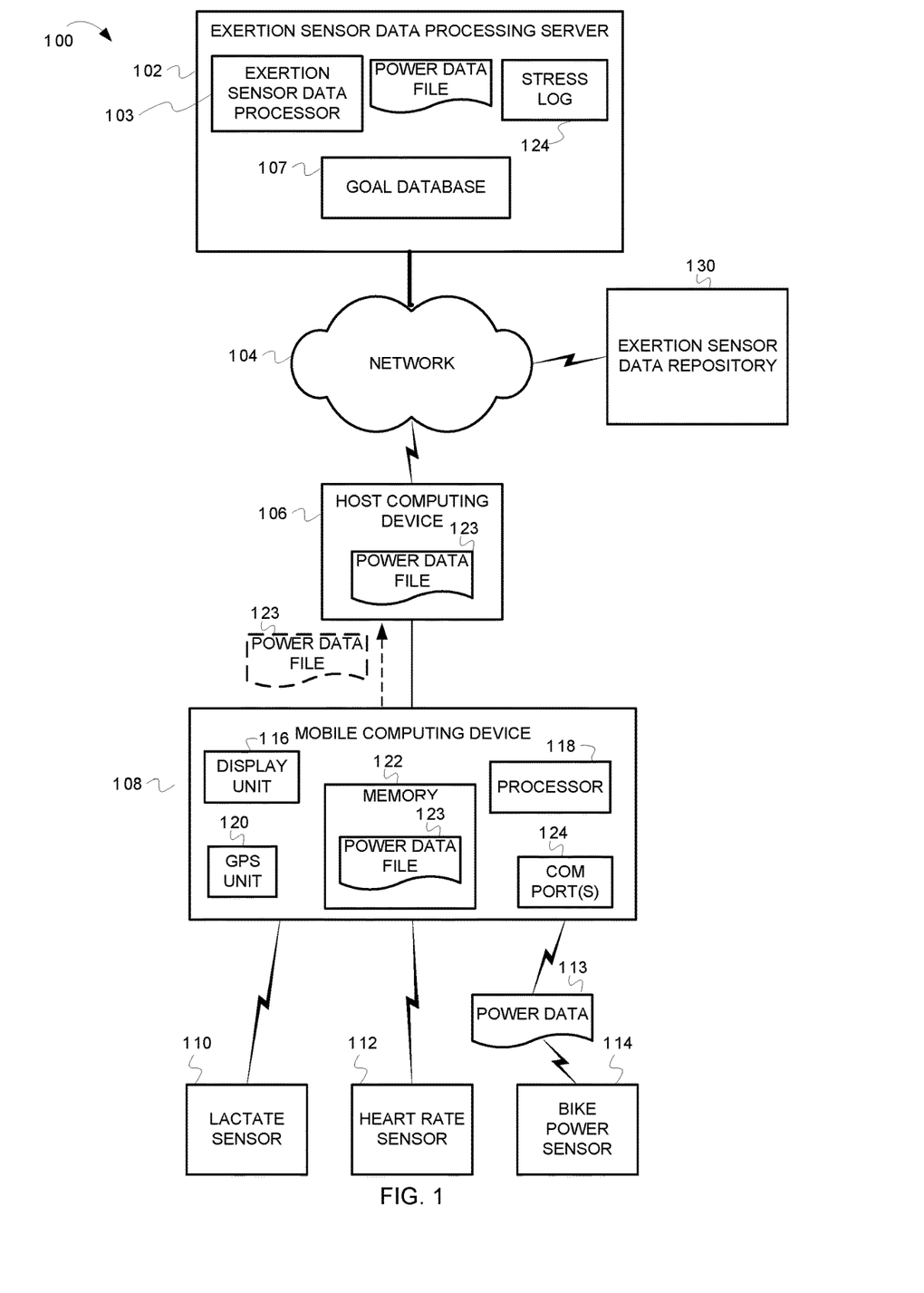
FIG. 1 is a block diagram illustrating components used in conjunction with some embodiments of the inventive subject matter.

FIG. 1 is a block diagram illustrating components used in conjunction with some embodiments of the inventive subject matter. In FIG. 1, a performance system 100 includes an exertion sensor data processing server 102 that includes an exertion sensor data processor 103. The performance server 102 is connected to a communication network 104, which is connected to a host computing device 106, and exertion sensor data repository 130. The host computing device 106 is connected to a mobile computing device 108, which includes a display unit 116, processor 118, memory 122, GPS unit 120, and communication ports 124. The mobile computing device 108 can communicate with various exertion detection devices, such as a lactate sensor 110, heart rate sensor 112, and bike power sensor 114, run pace sensor, run power sensor, etc. The connections in FIG. 1 can be either wired or wireless, and can employ any suitable connection technology. In some embodiments, the mobile computing device 108 communicates with the exertion sensor data processing server 102 (e.g., via the network 104) without communicating with the host computing device 106.

The exertion sensor data processor 103 generates workouts for an athlete. For example, the exertion sensor data processor can query an electronic relational database (goal database 107) to determine an athlete's goal race, such as a given triathlon race having specified swim, bike, and run distances. The exertion sensor data processor 103 can query the goal database 107 to determine the athlete's goal performance, such as times for completing each leg (swim/bike/run) of the race. The exertion sensor data processor 103 can also query the goal database 107 to determine a date for the goal race. Additionally, the exertion sensor data processor can query the goal database 107 for information indicating the athlete's capabilities, such as 500 m swim pace (maximum effort), functional threshold power (FTP) on a bicycle, and 5 k run pace (maximum effort). Other examples of the athlete's capabilities are lactate threshold for swim, bike, and run (e.g., represented in pace for a given distance). Using this information, the exertion sensor data processor 103 can generate a workout schedule that will assist the athlete in achieving the goal performance, at the goal race. The workout schedule can include swim, bike, and run workouts, where each workout subjects the athlete to a prescribed stress level, as determined by the exertion sensor data processor 103. The exertion sensor data processor 103 determines workout parameters based on the prescribed stress level, and the information about the athlete's capabilities. For example, the exertion sensor data processor can generate a workout schedule including bike workouts that include power-based intervals for the athlete (i.e., a workout including time intervals during which the athlete should maintain a prescribed exertion lever—such as a given Wattage). An example bike workout may have a prescribed stress level of 25. To generate a workout that will subject the athlete to a stress level of 25, the exertion sensor data processor 103 considers the athlete's capabilities, and determines how much exertion is needed. The bike workout may require the athlete to do the following: 10 minute warm-up at any power, 20 minutes at 200 Watts (70% of FTP), 1 minute rest, 10 minutes at 240 Watts (84% of FTP), 2 minutes rest, and 5 minutes at 260 Watts (91% of FTP), and a 5 minute cool-down at any power. Given the prescribed stress level and the athlete's capability, the workout will result in a stress level of 25. The workout schedule includes a plurality of workouts (e.g., swim, bike, and run workouts) to be performed over time, up to race day. The time intervals, Wattages, and stress levels described herein are examples, as some embodiments may arrive at different stress levels for the same time intervals and Wattages.

As noted above, the exertion sensor data processor collects data files indicating an athlete's exertion during one or more prescribed workouts. The performance system uses data derived from the various exertion detection devices (lactate sensor 110, heart rate sensor 112, and bike power sensor 114) to determine whether the athlete achieved the prescribed stress level.

In one embodiment, the power sensor 114 resides on a bicycle (not shown). The bike power sensor 114 can be a crank-based power sensor residing on or about bicycle's cranks. Alternatively, the bike power sensor 114 may be a hub-based power sensor residing in the bicycle's rear wheel hub, pedal-based power sensor, or any other suable power sensor. In some instances, the bike power sensor 114 can detect a rider's power output on the bicycle's pedals, and provide indications of the rider's power to the mobile computing device 108. For example, the power sensor 114 can periodically detect the rider's power, and periodically transmit bike power data indicating the rider's power at a given instant. In some embodiments, the bike power data indicates the rider's power in Watts, or other suitable units of power/exertion.

The mobile computing device 108 can receive the bike power data 113 (or other exertion-sensor-derived data from another exertion detection device), and present it on the display unit 116 (e.g., in real-time for the athlete to see during exertion). Additionally, the mobile computing device 108 can store in the memory 122 the power data as part of a bike power data file 123. In some embodiments, the bike power data file 123 includes all the power indications for a given time period (e.g., a given ride, a given workout, etc.). In some embodiments the mobile computing device 108 transmits the bike power data file 123 to the exertion sensor data processing server 102, via the network 104. In other embodiments, the mobile computing device 108 transmits the bike power data file 123 to the host computing device 106, which in turn transmits the bike power data file 123 to the exertion sensor data processing server 102. In other embodiments, the mobile computing device 108 transmits the bike power data file 123 to the exertions sensor data repository 130, which can provide the bike power data file 123 (or exertion-sensor-derived data contained in the bike power file 123) to the exertion sensor data processing server 102. In yet other embodiments, the exertion sensors can transmit exertion data to suitable device.

The bike power data file 123 can include a plurality of power samples taken during a time period, such as during a bike ride, bike-based workout (e.g., bike ride on a stationary trainer), etc. Additionally, the bike power data file 123 can include other power information, such as average power over one or more selected distances, average power over one or more selected times, etc. In some embodiments, the power data can be processed according to various processing components (e.g., in the mobile computing device) that normalize instantaneous power readings (or averages) based on various parameters, such as power variability, consistency, etc.

As noted, the exertion sensor data processing server 102 receives the bike power data file 123 over a network. As noted, the bike power data file 123 can indicate a rider's exertion for a given time period. The exertion sensor data processing server's exertion sensor data processor 103 may convert the bike power data file 123 into a format that may be more efficiently processed (e.g., text format). After any necessary conversion, the exertion sensor data processor 103 processes the bike power data file 123 to determine a stress level indicator (e.g., an integer value) resulting from the associated bike workout. The exertion sensor data processor 103 inserts the stress level indicator into a stress log 124 that tracks an athlete's workout-based stress for one or more workouts in a given time period. In some embodiments, the stress log 124 is represented in a relational database. In some instances, the stress log includes only the stress level indicators for a given time period. In other instances, the stress log also includes bike power data files, run pace data files, and swim pace data files. That is, although FIG. 1 refers to a bike power data file, embodiments also similarly process swim data files, run data files, and any other suitable files (also referred to as "exertion data files"). Moreover, the exertion data files can include data derived from any suitable exertion detection device, such as a lactate sensor, heartrate monitor, GPS run/bike/swim watch, etc. For more details about how the performance server may perform stress logging, see FIGS. 6 and 7.

The exertion sensor data processor 103 utilizes the exertion data files and stress log to implement an electronic feedback loop that adaptively modifies the athlete's workout schedule, if needed. Periodically (e.g., weekly), the exertion sensor data processor 103 processes the stress level indicators for a given time period to determine the athlete's overall stress level for the time period. The overall stress level indicates an accumulation of stress resulting from physical exertion arising from the workouts on the athlete's workout schedule during the time period (aka a training phase). The exertion sensor data processor 103 determines whether the overall stress for the given time period is within an acceptable range. If the overall stress is acceptable, the exertion sensor data processor 103 does not modify the athlete's workout schedule. However, if the stress level for a given period is too low, the exertion sensor data processor modifies the workout schedule. For example, the workout schedule may include "rest" weeks (e.g., weeks in which stress levels are relatively low to give the athlete a recovery time), and "build" weeks (e.g., weeks that subject the athlete to relatively high stress). A workout schedule may include the following sequence: build week, build week, rest week, build week, and rest week (see also FIG. 3 at block 306, and FIG. 4). If the exertion sensor data processor 103 determines the athlete's stress is too low, the exertion sensor data processor can change an upcoming "rest" week into a "build" week (e.g., because the athlete has not accumulated enough stress to require a rest week). Therefore, the exertion sensor data processor 103 adaptively modifies the athlete's workout schedule to maximize the athlete's fitness gains, given the athlete's workout history, as monitored using data derived from exertion detection devices. For more details about how some embodiments modify the workout schedule, see FIG. 8.

Figure 2:
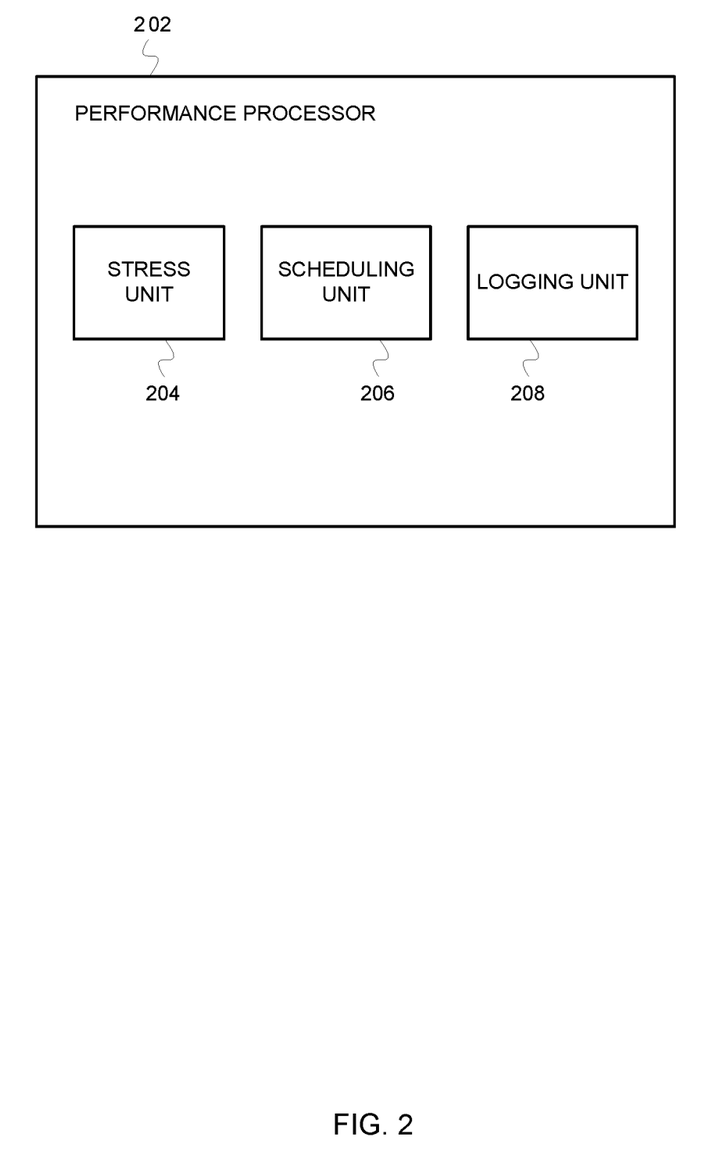
FIG. 2 is a block diagram illustrating an embodiment of the exertion sensor data processor.
Figure 3:
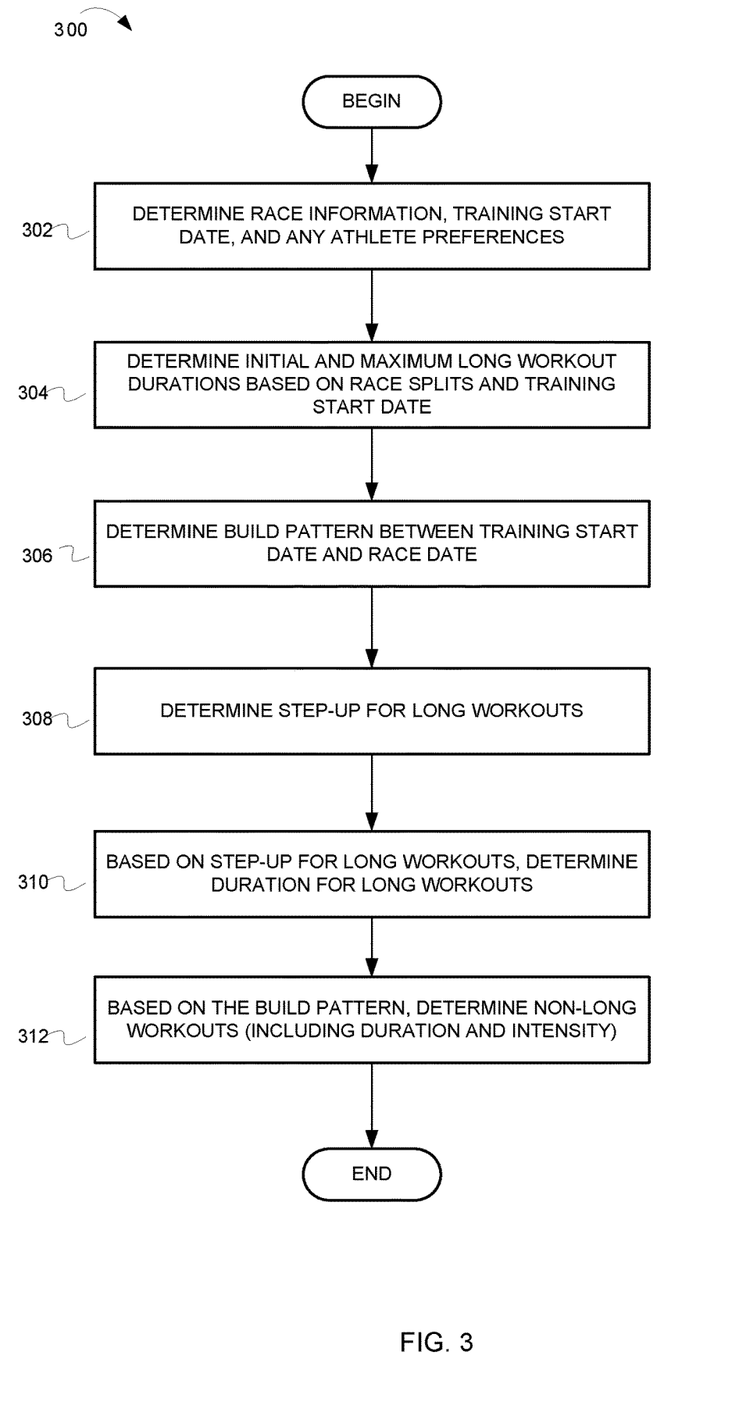
FIG. 3 is a flow diagram illustrating operations for determining a workout schedule, according to some embodiments.

The exertion sensor data processor includes specialized components that can create an optimal training schedule according to a human performance model. FIG. 2 is a block diagram illustrating an embodiment of the exertion sensor data processor. The exertion sensor data processor 202 includes a stress unit 204, scheduling unit 206, and logging unit 208. Initially, the exertion sensor data processor's scheduling unit creates a schedule leading up to the goal race date. The schedule may look like those shown in FIG. 5. Although the schedule in FIG. 3 is shown in weeks, other time blocks are possible. After the exertion sensor data processor creates the schedule, the exertion sensor data processor's stress unit 204 determines stress for each week leading up the goal race. That is, the stress unit 204 executes logic that determines stress levels based on a suitable human performance model, given certain input parameters, such as goal time, athlete capability data, etc.

FIG. 3 is a flow diagram illustrating operations for determining a workout schedule, according to some embodiments. At block 302, the exertion sensor data processor determines an athlete's race goals, training start date, and scheduling preferences. In some embodiments, the exertion sensor data processor can present a user interface (e.g., a web page, application program window, etc.) through which an athlete can enter the athlete's race goals, training start date, and scheduling preferences. The race can be a triathlon, and the race goals can include goal swim time, goal bike time, and goal run time. For example, if the triathlon is a 70.3 mile triathlon race, the goal swim time may be 30 minutes, the goal bike time 2 hours 45 minutes, and the goal run time 1 hour 35 minutes. The scheduling preferences may indicate that the athlete prefers to do long run workouts on Wednesdays, and long bike workouts on Saturdays. Typically, each week of the schedule has one long bike workout and one long run workout. The training start date indicates when an athlete will begin training.

At block 304, the exertion sensor data processor determines initial and maximal "long workout" durations. In some embodiments, the exertion sensor data processor the exertion sensor data processor makes this determination based, at least in part, on the race goals (e.g., swim, bike, and run goal times), and a human performance model for building fitness. For example, if an athlete's goal bike time is 2 hours 45 minutes, the maximal bike workout may be 3 hours 10 minutes. Given enough time between the training start date and the race date, the exertion sensor data processor can select a suitable weekly workout duration step-up to slowly build the athlete from an initial long bike duration to a maximal long workout duration, over a number of weeks. The exertion sensor data processor may also take into account the athlete's initial fitness level (e.g., as indicated by the athletes functional threshold power (FTP) on a bicycle, all-out 500 m swim time, and all-out 5 kilometer run time). In some embodiments, the exertion sensor data processor also determines intensity for the long workouts (e.g., Bike power in Watts, run pace, swim pace, target heartrate range, etc.). The exertion sensor data processor may select the duration and intensity based, at least in part, on a human performance model for building fitness.

At block 306, the exertion sensor data processor determines a build pattern from the training start date to the race date. The build patter includes various training week types, where each training week type will prescribe different stress levels. For example, the build pattern can be: build week, build week, rest week, build week, build week, rest week, taper week, race week. In some embodiments, build weeks prescribe the most stress, taper weeks proved less stress than build weeks, rest week prescribes less stress than taper week, and where race week prescribes least stress of all week types. In some embodiments, the race build pattern must include a race week, and one or more taper weeks. To ensure that the build patter includes the required week types, the exertion sensor data processor works backwards in time from the race date to the initial start date. Some embodiments do not require certain week types. In some instances, each successive build week includes long workouts that are longer than the previous build week's long workouts. In some instances, the long workout intensity increases in successive build weeks. Increases in intensity and duration require more exertion, and cause more stress on the athlete. For rest weeks, the long workouts and non-long workouts may be significantly shorter than those of a build week. Similarly, taper week workouts may be shorter than build week workouts. Race week workouts may be relatively very short with high intensity.

In some embodiments, regardless of the number of weeks between the start date and race date, the exertion sensor data processor includes a taper week, and race week for the schedule. The remaining weeks may not allow for a repeatable pattern. Therefore, the exertion sensor data processor selects the week type. An example build patter may be: build week, build week, rest week, build week, taper week, race week. In some embodiments, the exertion sensor data processor selects patterns that impose the least amount of stress on an athlete necessary to achieve the athlete's race goals.

In some embodiments, each week in the build pattern calls for a particular amount of stress—duration and exertion intensity of the workouts. For example, if a particular week calls for a prescribed stress level (e.g., 40), then the sum of stress from the week's workouts should add-up to the prescribed stress level. Achieving a prescribed stress level requires different durations and exertion intensities from different athletes. For a given workout duration, a very fit athlete requires relatively high exertion intensity (e.g., run pace, bike Watts, etc.) to achieve a prescribed stress level, whereas a less fit athlete requires lower exertion intensities. In some embodiments, the exertion sensor data processor chooses a build pattern (having associated stress levels for each week type) that includes optimal stress to put the athlete at a physical peek on the race date.

At 308, the exertion sensor data processor determines a step-up for the long workouts. As noted above, the exertion sensor data processor selects initial and maximal long workouts (e.g., 2 hour initial long bike workout, and 3 hour 10 minute maximal long bike workout). Given enough time, the performance process will step-up the long workout duration 15 minutes each week. However, if the number of weeks between training start and race date is too short to accommodate a 15 minute weekly step-up, the exertion sensor data processor will increase the step-up an amount suitable for the given time (based on a selected human performance model).

At block 310, the exertion sensor data processor determines long workout duration based on: initial long workout duration, maximal long workout duration, and step-up duration. The exertion sensor data processor may also determine exertion intensities for the long workouts. The exertion sensor data processor may select the exertion intensity based on: 1) stress needed for the workout (e.g., for the given the week type) 2) the athlete's capabilities (e.g., functional threshold power for a bike, functional threshold pace for running, etc.—entered at block 302), and 3) workout duration.

At block 312, the exertion sensor data processor determines non-long workouts (duration and intensity) based on the build pattern. For example, consider a build patter of: build week, build week, rest week, build week, taper week, race week. For the given build pattern, the exertion sensor data processor determines duration and exertion intensity for the non-long workouts. Just as the exertion sensor data processor determines initial duration, step-up, and exertion intensity for long workouts, it can do similar operations for non-long workouts. In some embodiments, each week includes at least one long bike workout, one long run workout, and one long swim workout. In other embodiments, each week includes at least one long swim, bike, or run workout.

Figure 4:
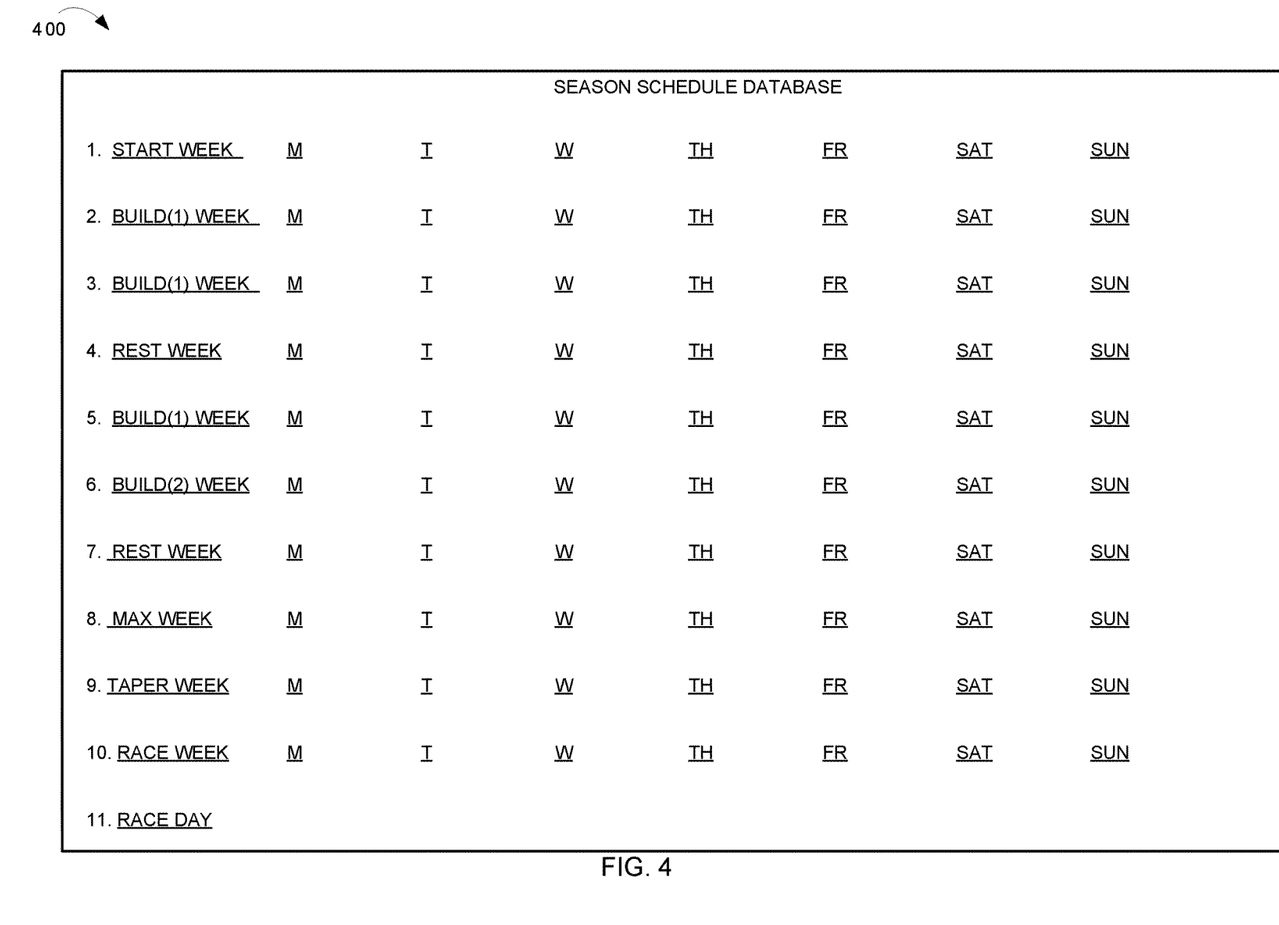
FIGS. 4 illustrates an initial workout schedule, according to some embodiments.

FIGS. 4 illustrates an initial workout schedule. In FIG. 4, the schedule includes week types, but no other data (e.g., generated as a result of block 306).

Figure 5:
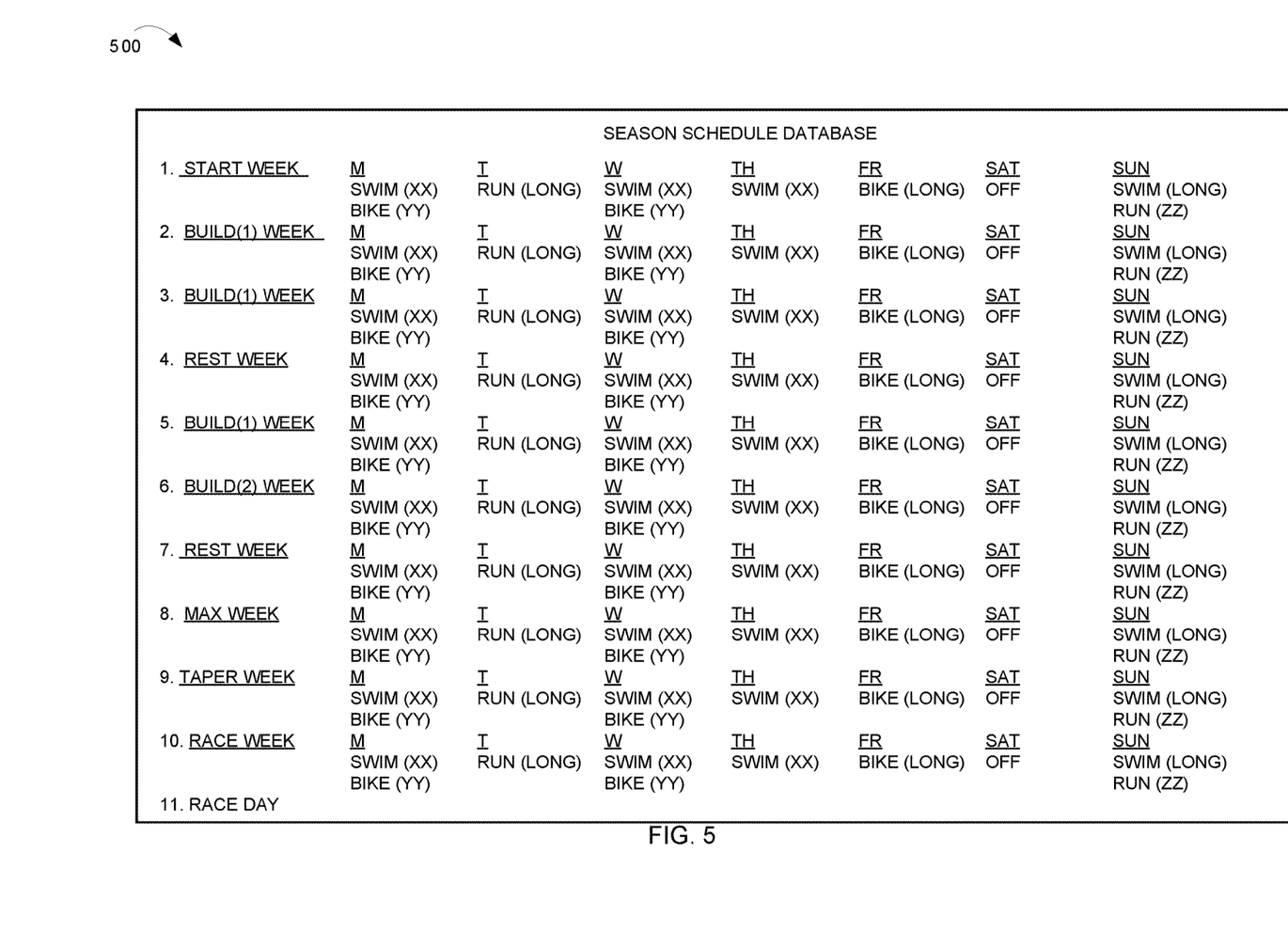
FIG. 5 illustrates a workout schedule, according to some embodiments.

FIG. 5 illustrates a workout schedule. In FIG. 5, the schedule includes workout durations, as represented by "(XX)", in the drawing. Based on an athlete's capabilities, the exertion sensor data processor can determine an exertion intensity for the given durations. In some instances, although not shown, the workouts are broken into a plurality of time intervals, where each interval has an associated duration and exertion intensity. For example, a 52 minute bike workout duration may include the following intervals: 10 minute warm-up at 200 Watts, 20 minutes at 240 Watts, 10 minutes at 260 Watts, 2 minutes rest, and 10 minutes at 280 Watts. The exertion sensor data processor selects the intervals and exertion intensities to achieve a prescribed stress level for the given week (e.g., build week, rest week, etc.).

Figure 6:
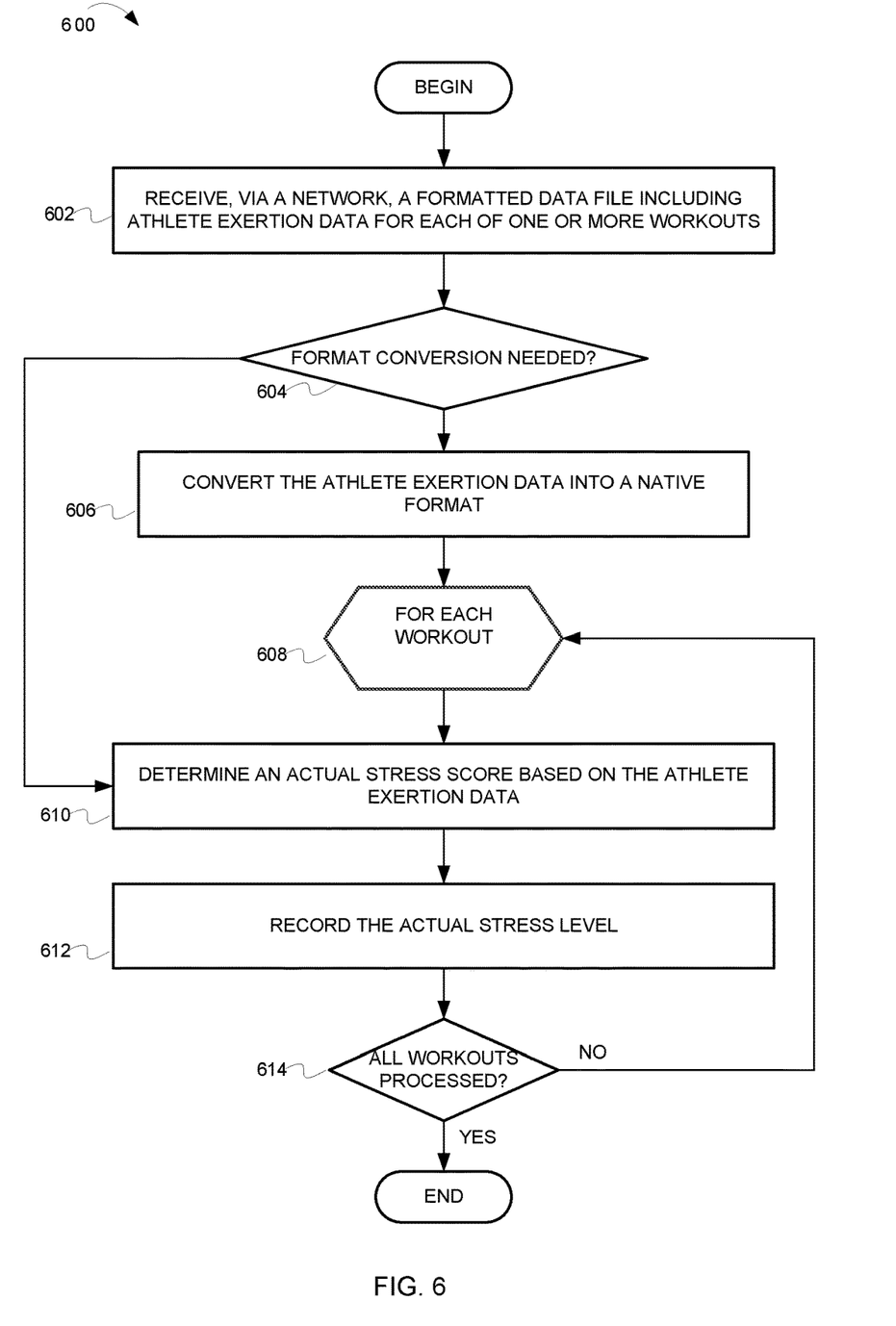
FIG. 6 is a flow diagram illustrating operations for processing exertion data derived from exertion sensors, according to some embodiments.

FIG. 6 is a flow diagram illustrating operations for processing exertion data derived from exertion sensors. The exertion sensor data processor can use the exertion-sensor-derived data to track an athlete's actual exertion for a given prescribed workout. In FIG. 6 (see block 602), the exertion sensor data processor receives a formatted data file over a communications network, where the file includes exertion data based on output from one or more exertion sensors. The data file can be in any suitable format, such as in Garmin format, text format, HTML format, XML format, etc. The data file includes exertion data for one or more workouts.

At block 604, the exertion sensor data processor determines whether exertion data in the data file requires a format conversion. If the exertion data is in a format natively processed by the exertion sensor data processor, the flow continues at block 610. Otherwise, the flow continues at block 606, where the exertion sensor data processor converts the athlete exertion data into a format suitable for further processing.

Blocks 608, 610, 612, and 614 form a loop of operations that are repeated until all workouts in the data file are processed. For each workout in the athlete exertion data, the exertion sensor data processor determines an actual stress level based on the athlete exertion data (610), and records the actual stress level (612) in the stress log 124 (e.g., an electronic relational database). As noted herein, stress levels may be represented by integer values. This loop repeats for all workouts in the athlete exertion data (614).

Figure 7:
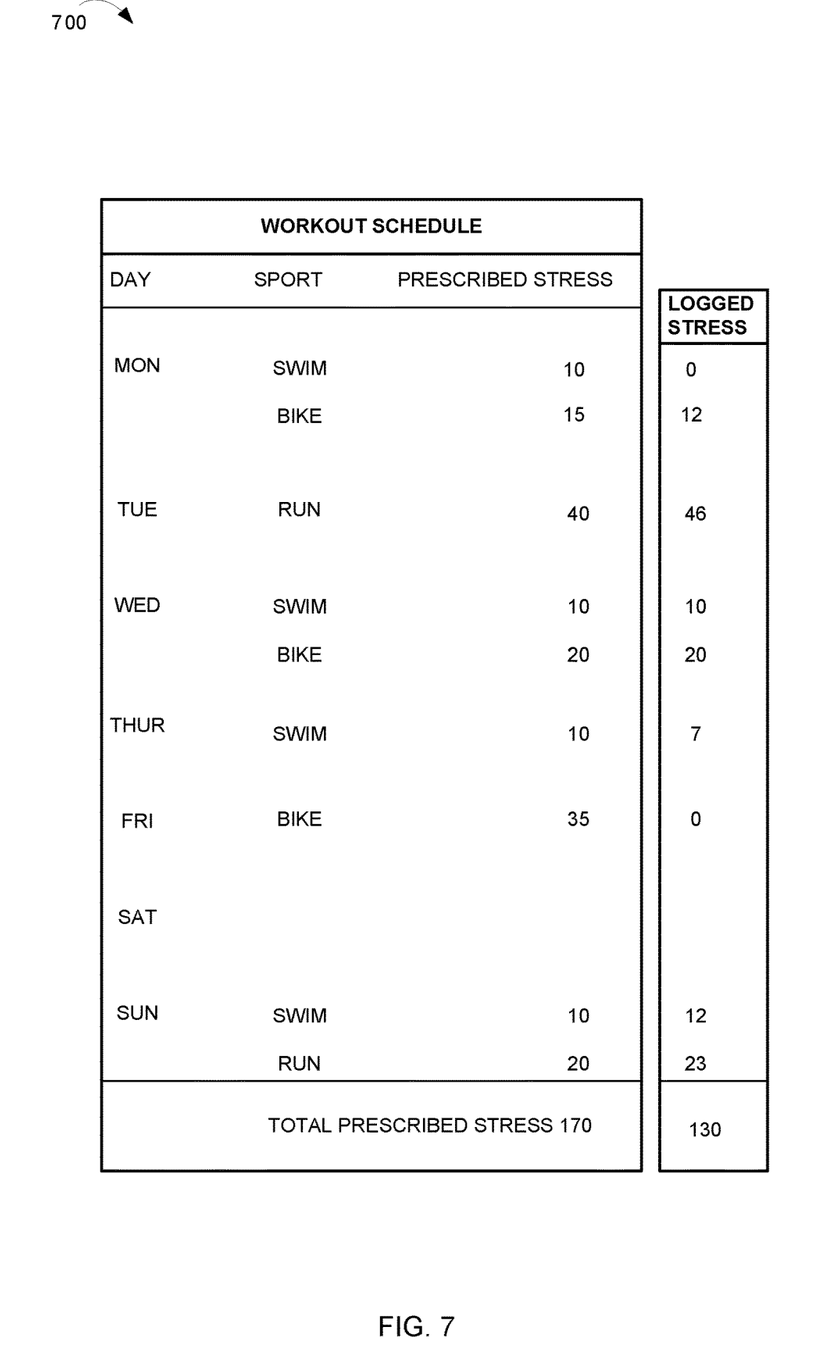
FIG. 7 shows database tables, according to some embodiments.

FIG. 7 shows database tables. The workout schedule table includes prescribed stress for each workout. The logged stress table includes actual stress levels based on data received from a mobile computing device 108 (e.g., after the exertion sensor data processor performs the operations shown in FIG. 6). For example, the mobile device 108 uploads a data file including exertion data from a bike workout (e.g., as determined by a bike power sensor 114). The exertion data may be produced by (or otherwise derived from) bike power sensors, such as a bicycle-mounted power meter, cycling-trainer-integrated power meter, heart rate monitor, GPS-based bike computer, GPS-based run pace tracker, etc. In some instance the exertion data indicates bike power in Watts, run pace in distance per time, run exertion in Watts, swim pace in distance per time, etc. Embodiments can use any suitable exertion data for any workout, such as run pace data, swim pace data, heart rate data, blood lactate information, etc.

As the exertion sensor data processor receives data about the athlete's actual exertion, it can modify the athlete's workout schedule. For example, an athlete may not have met a prescribed stress level for a given week because the athlete missed one or more workouts. The exertion sensor data processor can adaptively adjust the workout schedule to impose more stress on the athlete, to make up for the missed workouts. In one example of this, consider a scenario where an athlete misses several workouts during a build week, and has a rest week following the build week. In such a scenario, the exertion sensor data processor can rebuild the workout schedule, substituting a build week for the originally scheduled rest week. If the athlete's actual stress level exceeds the prescribed stress level, the exertion sensor data processor may modify the athlete's workout schedule to reduce future prescribed stress levels. This will allow the athlete to recover, and avoid over-training and injury.

Figure 8:
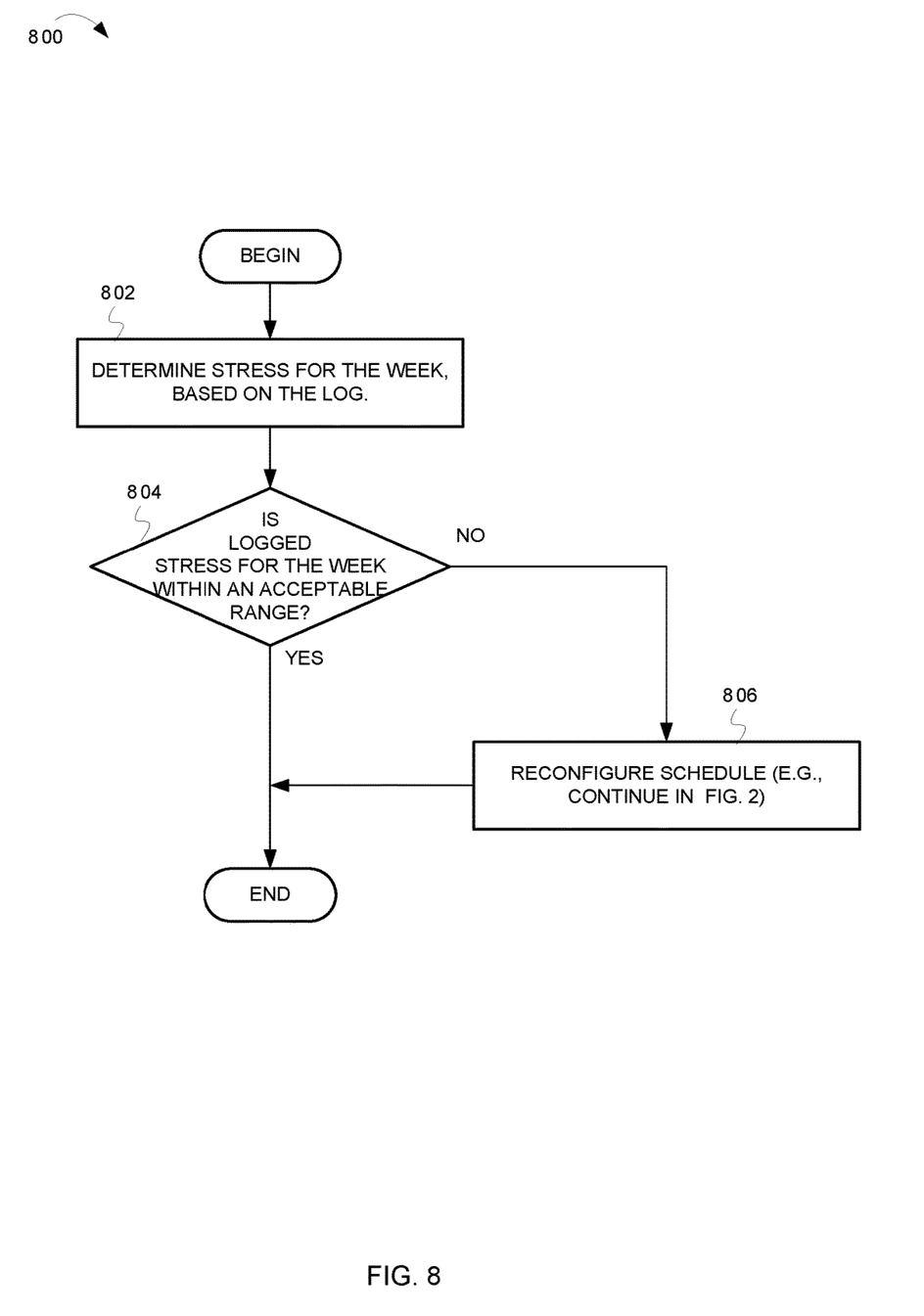
FIG. 8 illustrates a flow diagram including operations for adaptively reconfiguring a workout schedule based on exertion-sensor-derived exertion data, according to some embodiments.

FIG. 8 illustrates a flow diagram including operations for adaptively reconfiguring a workout schedule based on an electronic feedback loop, according to some embodiments. As shown, the performance process processor determines an athlete's actual stress based on exertion data. If the stress is outside an acceptable range, the exertion sensor data processor adapts the workout schedule. In some embodiments, to modify the workout schedule, the exertion sensor data processor moves from FIG. 8 to FIG. 3, and performs operations shown in FIG. 3. If the exertion sensor data processor rebuilds the workout schedule by executing operations shown in FIG. 3, the training start date would be the date on which the workout schedule is rebuilt (see 302). The athlete preferences are whatever are in the database. The initial long workout duration may be based on the last long workout recorded in the database, whereas the maximal long workout may remain the same (see 304). The build patter may be based on the number of weeks remaining until the race date (see 308). Therefore, the build pattern may change. The step-up for long workouts may change based on the number of weeks until the race date (see 310), and so may the long workout duration (see 310).

Embodiments of the inventive subject matter can include one or more computer readable mediums. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Additional Embodiments

In some embodiments, the system includes a stationary cycling trainer that simulates road cycling. The cycling trainer may include a resistance wheel that interfaces with the bicycle's drive wheel. To simulate road cycling, the trainer's resistance wheel exerts resistance on the bicycle's drive wheel. For some cycling trainers, the resistance is controlled electronically. For example, depending on the desired simulation, the cycling trainer can apply greater or lesser resistance to the bicycle's drive wheel. For simulating hill climbing, the trainer exerts relatively high resistance. For simulating flat roads, the trainer exerts relatively lower resistance. In addition to controlling resistance, some cycling trainers include components that measure and record a rider's exertion over a given time period. For example, some cycling trainers include components that measure and record a rider's power output in Watts (or any other suitable unit of measure) over a given time.

As noted, some cycling trainers apply resistance directly to the bicycle's drive wheel. However, other cycling trainers interface directly into the bicycle's drivetrain. For instance, some cycling trainers require removal of the bicycle's drive wheel and cassette. Such a cycling trainer includes a cassette that couples to the bicycle's drive chain, and applies resistance to the bicycle's drive gear (i.e., front chain ring which is connected to bicycle's pedals). These cycling trainers may include components for applying a prescribed resistance, and components that measure and record a rider's exertion over a given time period. Base on the rider's exertion, other components (e.g., an analysis device external to the cycling trainer) can determine other metrics (e.g., rider calorie burn, normalized power output, average power, etc.).

Cycling trainers that are natively capable of determining rider exertion may send power data 113 to a mobile computing device 108. Alternatively, such cycling trainers may send power data files 123 to the host computing device 106, or the exertion sensor data processing server 102. Therefore, such cycling trainers may perform the functionality of a bike power sensor 114 and other components shown in FIG. 1.

Some cycling trainers do not include components for applying a rider-selected resistance to a bicycle. Instead, such trainers may include a flywheel connected to a fluid-filled resister, a friction resister, or other suitable resister. The resistance varies according to a resistance profile associated with the cycling trainer's resister. For example, a fluid resistance trainer may apply more resistance as RPMs increase, where the resistance is determined by the mechanics of the resistor. For these cycling trainers, riders can use the bicycle's gearing controls to adjust the cycling trainer's effective resistance. For example, a rider can actuate the bicycle's rear derailleur to increase the bicycle's gear ratio, thereby increasing the effective resistance felt by a rider. These cycling trainers may not inherently include components for measuring and recording a rider's exertion. However, these cycling trainers may be adapted to estimate rider exertion. In some instances, these cycling trainers may be adapted to measure and record rider resistance by adding a cadence sensor and rider exertion estimator. In some instances, the rider exertion estimator is separate from the cycling trainer. For example, the rider exertion estimator can be a mobile electronic device that receives cadence information from a cadence sensor mounted on the bicycle, cycling trainer, or other suitable location. By measuring cadence (i.e., revolutions per minute of the bicycle's drive gear) and knowing the cycling trainer's resistance profile, the rider exertion estimator can estimate a rider's power output over a given time. The rider exertion estimator can also record the power output, and determine other metrics (e.g., rider calorie burn, normalized power output, average power, etc.). In some embodiments, the rider exertion estimator may be integrated into the mobile computing device 108 (See FIG. 1), or the host computing device 106 (e.g., the cadence sensor transmits cadence information to the host computing device 106). Irrespective of where the rider exertion estimator resides, the rider exertion estimator can produce power data files (see power data file 123 in FIG. 1) for use by embodiments of the exertion sensor data processing server 102.

Some embodiments simulate bicycle riding using a trainer cycle. In some instances, a trainer cycle is a stationary apparatus that includes components that simulate road cycling. Trainer cycles may include pedals, handlebars, and seat. Trainer cycles may include components for exerting resistance on its pedals. In some instances, trainer cycles include components for applying a prescribed resistance to its pedals. Trainer cycles may also include components for measuring and recoding a rider's exertion on the pedals. In some instances, the trainer cycle estimates a rider's exertion based on cadence and a known resistance profile, or other suitable factors. Trainer cycles can create power data 113 or power data files 123, for use by the exertion sensor data processing server 102.

The cycling trainers and trainer cycles described above can include components for transmitting, over a network, any information they collect or determine. For instance, the cycling trainers may include network interfaces that transmit information according to any suitable protocol, such as Wi-Fi, wireless telephone (e.g. LTE, 3G, etc.), Ethernet, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for implementing an electronic feedback loop based on exertion data derived from one or more exertion sensors including at least one of a bicycle power meter, a heart rate monitor, or a global positioning satellite watch, the method comprising:
generating, by an exertion sensor data processor, a workout schedule, wherein the generating includes
querying an electronic database for a race date, race performance goal, and athlete capability parameters;
determining a number of time units between a current date and the race date;
for each time unit of the number of time units
determining, by the workout processor, a prescribed stress level for the time unit;
generating by the workout processor, workouts that subject an athlete to the prescribed stress level for the time unit; and
storing the workouts in the workout schedule in the electronic database detecting, via the one or more exertion sensors, physical exertion during at least one of the workouts;
computing, by the exertion sensor data processor, an actual stress level for the at least one of the workouts, wherein the computing is based on the exertion data derived from the one or more exertion sensors;
querying, by the exertion sensor data processor, the electronic database for the prescribed stress level for the at least one of the workouts;
determining, by the exertion sensor data processor, that the actual stress level is less than the prescribed stress level for the at least one of the workouts;
in response to determining that the actual stress level is less than the prescribed stress level for the at least one of the workouts, modifying, by the exertion sensor data processor, the workout schedule; and
transmitting, over the electronic communications network, an electronic workout data file including the modified workout schedule for presentation on a remote display device.

2. The method of claim 1 further comprising:
converting the exertion data from a first electronic data format to a second electronic data format, wherein the second electronic data format is natively processable by the exertion sensor data processor.

3. The method of claim 1, wherein the bike power meter is part of a cycling trainer.

4. The method of claim 1, wherein each of the time units is a week.

5. The method of claim 1, wherein the race performance goal includes at least one of a time parameter, a heart rate parameter, or a power parameter.

6. The method of claim 1, wherein the race performance goal includes a swim time, a bike time, and a run time.

7. The method of claim 1, wherein the detecting, via the one or more exertion sensors, physical exertion during at least one of the workouts includes detecting at least one of power output on a bicycle, run pace, heart rate, or swim pace.

8. A computer-readable storage medium including instructions that, when executed by a processor, cause the processor to perform operations for implementing an electronic feedback loop based on exertion data derived from one or more exertion sensors including at least one of a bicycle power meter, a heart rate monitor, or a global positioning satellite watch, the instructions comprising:
instructions to generate, by an exertion sensor data processor, a workout schedule, wherein the instructions to generate includes
instructions to query an electronic database for a race date, race performance goal, and athlete capability parameters;
instructions to determine a number of time units between a current date and the race date;
instructions to for each time unit of the number of time units
determine, by the workout processor, a prescribed stress level for the time unit;
generate by the workout processor, workouts that subject an athlete to the prescribed stress level for the time unit;
instructions to store the workouts in the workout schedule in the electronic database instructions to detect, via the one or more exertion sensors, physical exertion during at least one of the workouts;

instructions to compute, by the exertion sensor data processor, an actual stress level for the at least one of the workouts, wherein the computing is based on the exertion data derived from the one or more exertion sensors;

instructions to query, by the exertion sensor data processor, the electronic database for the prescribed stress level for the at least one of the workouts;

instructions to determine, by the exertion sensor data processor, that the actual stress level is less than the prescribed stress level for the at least one of the workouts;

instructions to, in response to the determining that the actual stress level is less than the prescribed stress level for the at least one of the workouts, modify the workout schedule; and instructions to transmit, over the electronic communications network, an electronic workout data file including the modified workout schedule for presentation on a remote display device.

9. The computer readable storage medium of claim 8, the instructions further comprising:

instructions to convert the exertion data from a first electronic data format to a second electronic data format, wherein the second electronic data format is natively processable by the exertion sensor data processor.

10. The method of claim 8, wherein the bike power meter is part of a cycling trainer.

\* \* \* \* \*